(No Model.)

B. T. OTOS.
ANIMAL TRAP.

No. 311,778. Patented Feb. 3, 1885.

WITNESSES:
Fred G. Dieterich
Walter M. Conn

INVENTOR.
Berten T. Otos
By Edwd Underwood
ATTORNEYS.

UNITED STATES PATENT OFFICE.

BERTEN T. OTOS, OF WILLMAR, MINNESOTA.

ANIMAL-TRAP.

SPECIFICATION forming part of Letters Patent No. 311,778, dated February 3, 1885.

Application filed July 1, 1884. (No model.)

*To all whom it may concern:*

Be it known that I, BERTEN T. OTOS, a citizen of the United States, residing at Willmar, in the county of Kandiyohi and State of Minnesota, have invented certain new and useful Improvements in Animal-Traps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improvement in animal-traps; and it consists in certain details of construction and operation to be described hereinafter in the specification and claims.

The object of my said invention is to provide a trap which may be made of size suitable for mice, rats, and small birds or animals, but which by increasing the size is equally adapted to catching large birds or animals; and I do not desire to limit myself as to the size or dimensions of my traps. They may be varied to suit the ends in view.

Another object is to provide a trap which may be approached by the animal either from the front or side, and sprung by touching the bait or by stepping on any part of the exposed surface of the bottom board.

Figure 1:
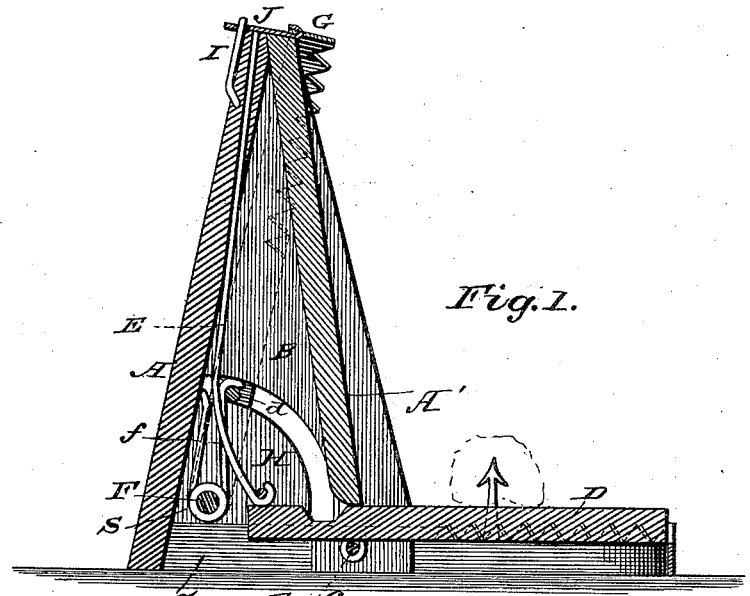
Figure 2:
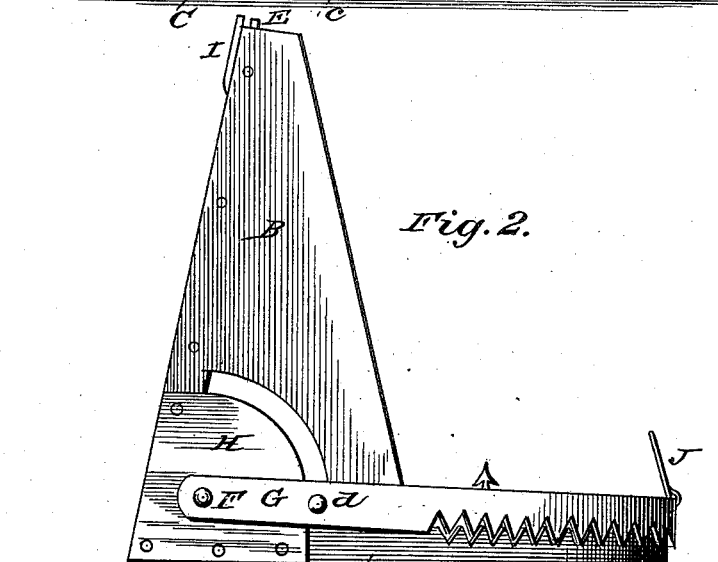
Figure 3:
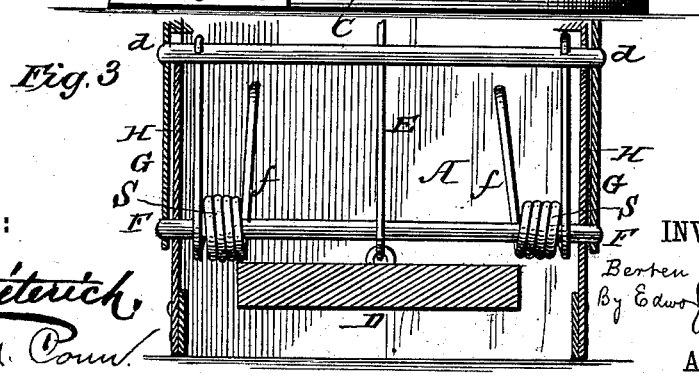

In the drawings herewith, Figure 1 is a vertical section showing the trap when set; and Fig. 2 represents the trap when sprung. Fig. 3 is a detail view.

My trap consists of an inclined metallic or wooden back piece, A, and a nearly-vertical front piece, A'. These pieces meet at the top and diverge at the bottom, where the piece A rests on the ground, and are held in place by the sides B and the frame C and corner-pieces H. Within the space formed by the parts A A' B H and hidden from view are the parts by which the trap is actuated. At the bottom, resting on the ground, and rigidly connected with the back A and sides B, is a frame, C, of strap-iron or steel, forming the lower jaw. This is bent in the shape of a rectangle, having its front corners rounded, and having a shaft, c, journaled therein, on which the bottom D is hung so that the bottom can rock or tilt on the shaft. At the rear end of the bottom D a rod, E, is attached, and the upper end of the rod passes through an opening in the top of the back A. By leaving the front and sides of the bottom open to approach, it it will make no difference whether an animal comes from the front or sides, as the pivot-shaft c is so near the rear end of the bottom that a great amount of leverage is obtained in front, and a touch on the exposed surface of the bottom will spring the trap; nor is it necessary that the animal should be attracted by the bait, for if the trap is placed in the path of an animal, it will be sprung by its stepping on it. It may be used for trapping animals which live in or frequent the water by sinking it in their haunts. A chain will be attached in such case, as also in the case of very large animals on land. Attached to the back piece, A, and frame C are corner-pieces H, of sheet-iron or other suitable material, which nearly close up the open space in the side pieces, leaving a narrow opening in which a rod, d, rises and falls. Through openings in the corner-pieces pass and are secured the ends of a rod, F, on which the jaw G is pivoted. This jaw is a metallic strap, shaped like the frame C, and large enough to pass over it in its descent when the trap is sprung. Through openings in G passes another rod, d, which moves in the narrow opening between the sides B and corners H when the jaw G rises and falls. Spiral springs S are twisted round the rod F, and their ends are bent into arms f, which hook over the rod d near its ends and press the jaw G down upon and over the frame or lower jaw, C, when the hook is released. Both the jaw G and the frame or lower jaw, C, are provided with serrated edges, or they may be made plain. At the top of the back A, directly in rear of the opening for rod E, is a short holding-pin, I, rising slightly above the back A, on which the hook J of the upper jaw catches when the trap is set. The bottom D is shaped like the frame C, and its front portion moves up and down therein on its shaft c, which is attached to said bottom by eyebolts or staples, and it has near its center a spike or catch, to which the bait is attached. When the bottom is raised on its pivot rod or shaft, the end of the rod E sinks below the top of back A; but when the bottom is depressed, the rod E rises and lifts the hook J off of the holding-pin I, releasing the upper jaw, and the springs force it down over the lower jaw or frame.

To set the trap, lift the upper jaw until the hook thereon engages with the pin I. The hook will force the rod E down and lift the front end of the bottom D, and when the slightest pressure is applied to the bottom the rod E will rise and release the hook, and the trap will be sprung.

Having thus described my invention, what I claim therein as new, and desire to have secured by Letters Patent, is—

1. An animal-trap constructed as described, having a base forming a fixed jaw, C, and a movable jaw, G, in combination with the spring S, the pivoted movable bottom D, the rod E, the hook J, and the pin I, all as herein set forth.

2. In an animal-trap, the combination of the frame A A' B H with the fixed jaw C, the movable jaw G, pivoted on the rod F, with suitable devices for holding the movable jaw when the trap is set, the pivoted bottom D, the rods E d, and the springs S, all substantially as shown and described.

3. The combination, in an animal-trap, of the jaws C and G, one fixed, the other movable, with the pivoted bottom D, the springs S, the rod E, the hook J, the holding-pin I, and the frame A A' B H, all substantially as shown, and for the purposes specified.

In testimony whereof I affix my signature in presence of two witnesses.

BERTEN T. OTOS.

Witnesses:
J. W. LANDQUIST,
PETER P. LANDIN.